US012419296B2

(12) United States Patent
Su

(10) Patent No.: US 12,419,296 B2
(45) Date of Patent: Sep. 23, 2025

(54) REMOTE DETECTION OF PRE-DETERMINED TERMITE FEEDING ACTIVITIES IN SOIL

(71) Applicant: University of Florida Research Foundation, Inc., Gainesville, FL (US)

(72) Inventor: Nan-Yao Su, Davie, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 524 days.

(21) Appl. No.: 17/368,054

(22) Filed: Jul. 6, 2021

(65) Prior Publication Data

US 2021/0337779 A1 Nov. 4, 2021

Related U.S. Application Data

(63) Continuation-in-part of application No. PCT/US2020/013809, filed on Jan. 16, 2020.
(Continued)

(51) Int. Cl.
*A01M 1/02* (2006.01)
*G08B 21/18* (2006.01)

(52) U.S. Cl.
CPC ........... *A01M 1/026* (2013.01); *G08B 21/182* (2013.01)

(58) Field of Classification Search
CPC A01M 1/00; A01M 1/02; A01M 1/20; A01M 1/2011; A01M 1/026
(Continued)

(56) References Cited

U.S. PATENT DOCUMENTS 3,564,750 A * 2/1971 Burgess ................ A01M 1/026
43/132.1
5,571,967 A * 11/1996 Tanaka ................... G01N 29/14
340/573.2
(Continued)

FOREIGN PATENT DOCUMENTS

AU 2018297307 A1 * 1/2020 ............ A01M 1/026
CN 101228860 A 7/2008
(Continued)

OTHER PUBLICATIONS

International Search Report for PCT/US20/13809 mailed Mar. 24, 2020.
(Continued)

*Primary Examiner* — Darren W Ark
(74) *Attorney, Agent, or Firm* — Thomas | Horstemeyer, LLP

(57) ABSTRACT

Various examples are provided related to remote detection of termite feeding activates. In one example, a termite feeding detection apparatus includes a consumption sensor module including durable bait; and a notification electronics module including a weather-proof enclosure communicatively coupled to the consumption sensor module. The consumption sensor module can detect when a threshold amount of the durable bait has been consumed and the notification electronics module can transmit a signal in response to detection of the threshold amount of durable bait consumption. In another example, a termite feeding detection system comprises at least one termite feeding detection apparatus; and a receptor configured to receive the signal transmitted by the notification electronics module of the termite feeding detection apparatus and store information associated to the signal.

18 Claims, 5 Drawing Sheets

Related U.S. Application Data

(60) Provisional application No. 62/793,183, filed on Jan. 16, 2019.

(58) Field of Classification Search
USPC .................................. 43/124, 131, 132.1
See application file for complete search history.

(56) References Cited

U.S. PATENT DOCUMENTS

| | | | | |
|---|---|---|---|---|
| 5,592,774 | A * | 1/1997 | Galyon | A01M 1/245 43/131 |
| 5,815,090 | A * | 9/1998 | Su | A01M 1/2011 43/132.1 |
| 5,877,422 | A * | 3/1999 | Otomo | A01M 1/2011 43/132.1 |
| 5,921,018 | A * | 7/1999 | Hirose | A01M 1/026 43/132.1 |
| 6,266,918 | B1 * | 7/2001 | Henderson | A01M 1/2011 43/132.1 |
| 6,357,170 | B1 | 3/2002 | Bordes | |
| 6,370,811 | B1 * | 4/2002 | Masterson | A01M 1/2011 43/132.1 |
| 6,378,243 | B1 | 4/2002 | Snell | |
| 6,397,516 | B1 | 6/2002 | Su | |
| 6,532,838 | B1 * | 3/2003 | Cates | A01M 1/026 73/865.8 |
| 6,724,312 | B1 | 4/2004 | Barber et al. | |
| 6,792,395 | B2 | 9/2004 | Roberts | |
| 6,834,611 | B2 * | 12/2004 | Berthold | A01M 1/2011 43/132.1 |
| 6,857,223 | B2 | 2/2005 | Su | |
| 7,057,516 | B2 * | 6/2006 | Donskoy | A01M 1/026 340/567 |
| 7,497,047 | B1 * | 3/2009 | Aesch, Jr. | A01M 1/2011 43/132.1 |
| RE40,884 | E * | 9/2009 | Masterson | A01M 1/2011 43/132.1 |
| 7,797,879 | B1 * | 9/2010 | Gross | A01M 1/026 43/132.1 |
| 9,671,353 | B2 * | 6/2017 | Go | A01M 1/026 |
| 11,019,813 | B2 * | 6/2021 | Shen | G08B 21/18 |
| 12,262,703 | B2 * | 4/2025 | Flint | A01M 1/026 |
| 2003/0014905 | A1 * | 1/2003 | Baker | A01M 1/2011 43/124 |
| 2004/0140900 | A1 * | 7/2004 | Barber | A01M 1/026 340/573.2 |
| 2004/0163303 | A1 * | 8/2004 | Berthold | A01M 1/026 43/124 |
| 2004/0237380 | A1 * | 12/2004 | Carpenter | A01M 1/2011 43/132.1 |
| 2005/0190063 | A1 * | 9/2005 | Lewis | A01M 1/026 340/573.2 |
| 2006/0017577 | A1 * | 1/2006 | Broussard | G08B 21/20 43/132.1 |
| 2007/0209271 | A1 * | 9/2007 | Mediate | A01M 1/026 43/132.1 |
| 2008/0204252 | A1 * | 8/2008 | Tolley | A01M 25/006 43/132.1 |
| 2010/0043276 | A1 | 2/2010 | Eger, Jr. et al. | |
| 2011/0265369 | A1 * | 11/2011 | Cink | A01M 1/026 424/84 |
| 2012/0085020 | A1 * | 4/2012 | Cink | A01M 1/226 343/702 |
| 2015/0027033 | A1 * | 1/2015 | Matsuura | A01M 1/2011 43/131 |
| 2016/0219858 | A1 * | 8/2016 | Cink | A01M 1/026 |
| 2017/0164597 | A1 * | 6/2017 | Brown | A01M 1/2011 |
| 2017/0238521 | A1 * | 8/2017 | Flint | A01M 1/2011 |
| 2017/0303524 | A1 * | 10/2017 | Azzarello | A01M 1/24 |
| 2018/0263232 | A1 | 9/2018 | Azzarello | |
| 2020/0196588 | A1 * | 6/2020 | Austin | A01M 1/026 |
| 2021/0000097 | A1 * | 1/2021 | Marchesini | G05D 1/102 |
| 2021/0259230 | A1 * | 8/2021 | Cosme Carvalho Ervilha | A01M 1/10 |

FOREIGN PATENT DOCUMENTS

| | | | | |
|---|---|---|---|---|
| CN | 102197795 | A | * | 9/2011 |
| CN | 102511460 | A | * | 6/2012 |
| CN | 102524213 | A | * | 7/2012 |
| CN | 203632704 | U | | 6/2014 |
| CN | 203968270 | U | | 11/2014 |
| CN | 104982399 | A | * | 10/2015 ............ A01M 1/026 |
| CN | 104991278 | A | * | 10/2015 |
| CN | 105532606 | A | * | 5/2016 |
| CN | 106125141 | A | * | 11/2016 ............... G01V 3/00 |
| CN | 106199729 | A | * | 12/2016 ............... G01V 3/00 |
| CN | 106546700 | A | | 3/2017 |
| CN | 106665523 | A | * | 5/2017 |
| CN | 208425294 | U | * | 1/2019 |
| CN | 208657741 | U | * | 3/2019 |
| CN | 109984106 | A | * | 7/2019 |
| CN | 209135191 | U | * | 7/2019 |
| CN | 209218981 | U | * | 8/2019 |
| CN | 110250130 | A | * | 9/2019 |
| CN | 210130284 | U | * | 3/2020 |
| CN | 211458608 | U | * | 9/2020 |
| CN | 211581284 | U | * | 9/2020 |
| CN | 211607947 | U | * | 10/2020 |
| CN | 212164654 | U | * | 12/2020 |
| CN | 212260224 | U | * | 1/2021 |
| CN | 212488097 | U | * | 2/2021 |
| CN | 213074121 | U | * | 4/2021 |
| CN | 213463538 | U | * | 6/2021 |
| CN | 213848332 | U | * | 8/2021 |
| CN | 213908074 | U | * | 8/2021 |
| CN | 213908075 | U | * | 8/2021 |
| CN | 214206915 | U | * | 9/2021 |
| CN | 215188943 | U | * | 12/2021 |
| CN | 215346601 | U | * | 12/2021 |
| CN | 215836660 | U | * | 2/2022 |
| CN | 215836661 | U | * | 2/2022 |
| CN | 216018632 | U | * | 3/2022 |
| CN | 216219673 | U | * | 4/2022 |
| CN | 216363270 | U | * | 4/2022 |
| CN | 216821381 | U | * | 6/2022 |
| CN | 217364346 | U | * | 9/2022 |
| CN | 217958423 | U | * | 12/2022 |
| DE | 202014102189 | U1 | * | 9/2015 ............ A01M 1/026 |
| EP | 1563730 | A1 | * | 8/2005 ............ A01M 1/026 |
| EP | 1570734 | A1 | * | 9/2005 .......... A01M 1/2094 |
| EP | 1652428 | B1 | | 5/2006 |
| JP | H0723684 | A | * | 1/1995 |
| JP | H07115887 | A | * | 5/1995 |
| JP | H07255344 | A | * | 10/1995 |
| JP | H07274792 | A | * | 10/1995 |
| JP | H0851908 | A | * | 2/1996 |
| JP | H09172934 | A | * | 7/1997 |
| JP | H09220044 | A | * | 8/1997 |
| JP | H09299009 | A | * | 11/1997 |
| JP | 2878591 | B2 | * | 4/1999 |
| JP | 2006034207 | A | * | 2/2006 |
| JP | 2008161130 | A | * | 7/2008 |
| JP | 2017042134 | A | * | 3/2017 |
| JP | 2020130153 | A | * | 8/2020 |
| KR | 101636972 | B1 | * | 7/2016 |
| WO | WO-0048461 | A1 | * | 8/2000 ............ A01M 1/026 |
| WO | WO-0106474 | A1 | * | 1/2001 ............ A01M 1/026 |
| WO | WO-0162079 | A1 | * | 8/2001 ............ A01M 1/026 |
| WO | WO-03020023 | A1 | * | 3/2003 ............ A01M 1/026 |
| WO | WO-2015154127 | A1 | * | 10/2015 ............ A01M 1/026 |
| WO | WO-2015179899 | A1 | * | 12/2015 ............ A01M 1/026 |
| WO | WO-2017005209 | A1 | * | 1/2017 ............ A01M 1/026 |
| WO | WO-2017083916 | A1 | * | 5/2017 | |
| WO | WO-2019010365 | A1 | * | 1/2019 ............ A01M 1/026 |

OTHER PUBLICATIONS

Eger, et al., "Durability of a Novel Durable Bait for Controal of Subterranean Termites (Isoptera: Rhinotermitidate): Results of Five-Year Field Aging Studies", Household and structural Insects, Entomological Society of America, 2019.

(56) References Cited

OTHER PUBLICATIONS

Rust, et al., "Managing Social Insects of Urban Importance", Annu. Reev. Entomol. Sep. 13, 2011.
Su, Nan-Yao., Field Evaluation of a Hexaflumuron Bait for Population Suppression of Subterranean Termites, Entomological Society of America, vol. 87. No. 2. 1994.
Su, Nan-Yao., "A computerized system for remote monitoring of subterranean termites near structures", Entomological Society of America, 2001.
Su, Nan-Yao., "Hermetically sealed baits for subterranean termites (Isoptera: Rhinotermitidae)", Entomological Society of America, 2007.
Su, Nan-Yao., "Technological needs for sustainable termite management", Department of Entomological and Nematology, Sociobiology, vol. 58., No. 1, 2011.
Su, et al., "Sustainable management of subterranean termite populations (Isoptera: Rhinotermitidae) in Armstrong Park, New Orleans, with Durable Bait", Journal of Economic Entomology, 109(3), 2016.

* cited by examiner

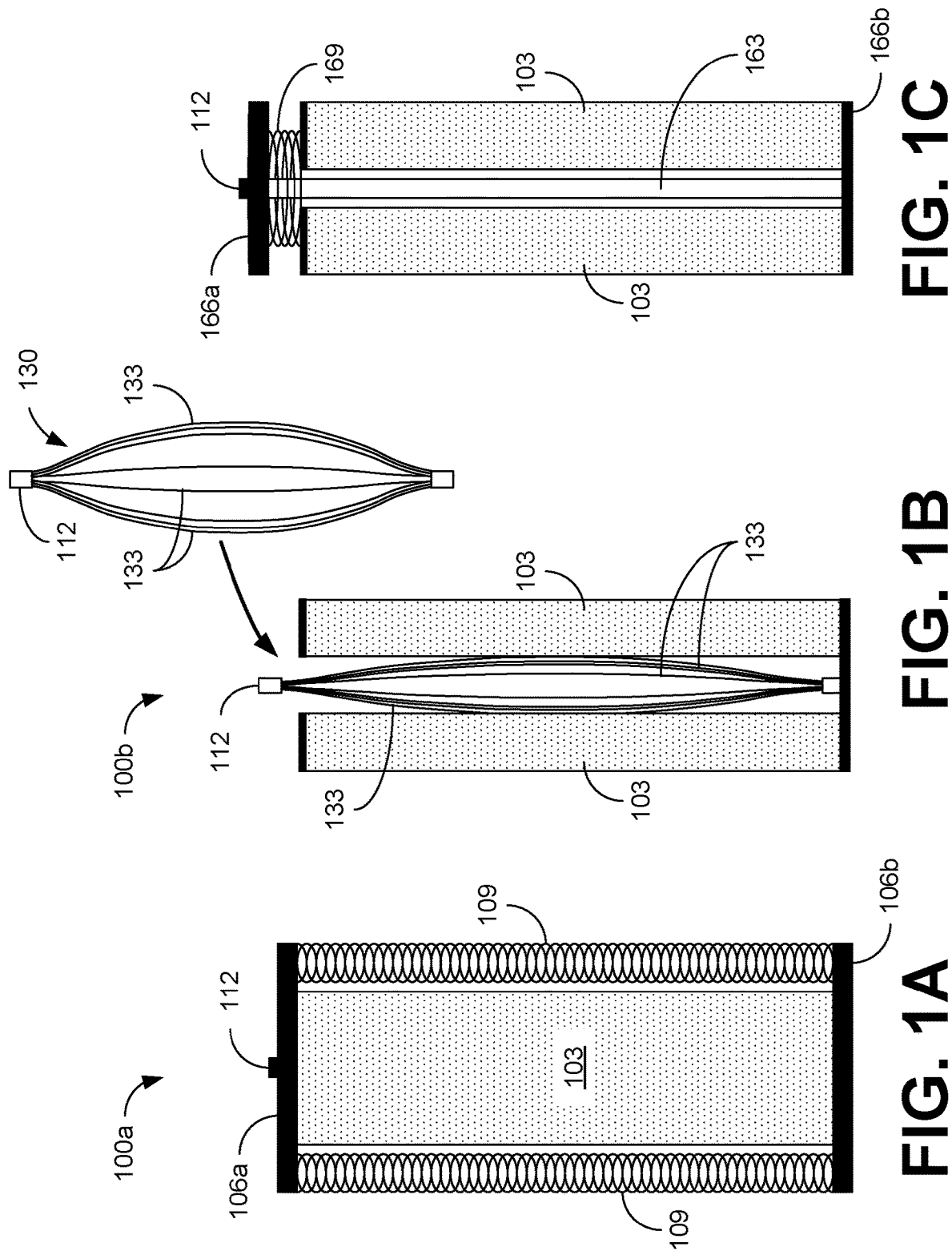

REMOTE DETECTION OF PRE-DETERMINED TERMITE FEEDING ACTIVITIES IN SOIL

CROSS REFERENCE TO RELATED APPLICATIONS

This application is a continuation-in-part claiming priority to, and the benefit of, co-pending International Application No. PCT/US2020/013809, filed on Jan. 16, 2020, which claims priority to, and the benefit of, U.S. provisional application entitled "Remote Detection of Pre-Determined Termite Feeding Activities in Soil" having Ser. No. 62/793,183, filed Jan. 16, 2019, both of which are hereby incorporated by reference in their entireties.

BACKGROUND

The first commercial termite bait product, the SENTRICON® Termite Colony Elimination System, became available in the US in 1995. The initial SENTRICON® system adopted a monitoring-baiting protocol, in which wooden stakes were placed inside in-ground stations that were routinely monitored on site and baits containing active ingredients were placed in the stations only when termites are found. Despite advantages of this system, the early bait system was not widely adopted by the termite control industry because the on-site routine monitoring of stations is labor-intensive and costly.

SUMMARY

Aspects of the present disclosure are related to remote detection of termite feeding activates. In one aspect, among others, a termite feeding detection apparatus comprises a consumption sensor module including durable bait; and a notification electronics module comprising a weather-proof enclosure communicatively coupled to the consumption sensor module, the notification electronics module configured to transmit a signal in response to detection of the threshold amount of durable bait consumption. The consumption sensor module can be configured to detect when a threshold amount of the durable bait has been consumed. In various aspects, the consumption sensor module can comprise non-corrosive mechanical components arranged to detect when the threshold amount of the durable bait has been consumed. The threshold amount can be greater than ⅓ of the durable bait initially installed in the consumption sensor module. The non-corrosive mechanical components can comprise an upper plate and a lower plate positioned on opposite sides of the durable bait. The upper and lower plates can be connected with a plurality of loaded springs thereby compressing the durable bait between the upper and lower plates. The upper and lower plates can collapse the durable bait when the threshold amount of the durable bait has been consumed. The upper plate can retract from the notification electronics module as the durable bait is collapsed, and the notification electronics module can be activated by the retraction of the upper plate.

In one or more aspects, the non-corrosive mechanical components can comprise a spring assembly including a plurality of leaf springs coupled at opposite ends and curving outward between the opposite ends. The spring assembly can be installed in a channel extending through the durable bait. The plurality of leaf springs can be compressed inward between the opposite ends to insert the spring assembly into the channel, where the opposite ends extend away from each other as the plurality of leaf springs are compressed. The plurality of leaf springs can expand outward when the threshold amount of the durable bait has been consumed, where the opposite ends retract toward each other as the plurality of leaf springs expand outward. The notification electronics module can be activated by the retraction of the opposite ends of the spring assembly.

In various aspects, the non-corrosive mechanical components can comprise a movable upper plate attached to a first end of a feeding rod passing through a channel extending through the durable bait. A second end of the feeding rod can be affixed at a bottom of the channel thereby compressing a spring between the movable upper plate and a top of the durable bait. The feeding rod can comprise a cellulosic material. The movable upper plate can be released when a portion of the feeding rod is consumed, and the spring can cause the upper plate to apply a force to the notification electronics module. In one or more aspects, the notification electronics module can comprise a trigger that releases a piston in response to a change in force against a flexible portion of the weather-proof enclosure. A spring can force the piston against a piezoelectric plate when released, thereby generating a burst of electricity that activates a signal emitter of the notification electronics module. The piston can comprise a permanent magnet that, when released, extends into a coil thereby generating a burst of electricity that activates a signal emitter of the notification electronics module. The notification electronics module can comprise a switch that couples a power source to a signal emitter in response to a change in force against a flexible portion of the weather-proof enclosure. The power source can be a lithium battery.

In another aspect, a termite feeding detection system comprises at least one termite feeding detection apparatus comprising: a consumption sensor module including durable bait, the consumption sensor module configured to detect when a threshold amount of the durable bait has been consumed; and a notification electronics module comprising a weather-proof enclosure communicatively coupled to the consumption sensor module, the notification electronics module configured to transmit a signal in response to detection of the threshold amount of durable bait consumption; and a receptor configured to receive the signal transmitted by the notification electronics module and store information associated to the signal. In various aspects, the information associated to the signal can be accessible by a remote host computer or handheld device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1C are graphical representations illustrating examples of a consumption sensor (module) in communication with a bait product, in accordance with various embodiments of the present disclosure.

DETAILED DESCRIPTION

Figure 2A:
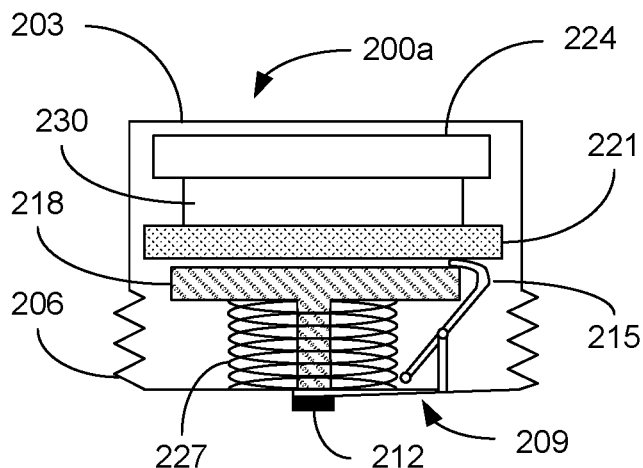
FIGS. 2A-2C are graphical representations illustrating examples of notification circuitry or electronics package (module), in accordance with various embodiments of the present disclosure.

Disclosed herein are various examples related to remote detection of termite feeding activates. Various methods, systems, assemblies and apparatus are described to detect the event of substantial bait consumption by termites. The disclosed examples can offer constant monitoring of termite bait stations to detect a single event of substantial bait consumption. To avoid corrosion of electronic circuitry in the hostile soil environment, a unique arrangement is described that can use a non-corrosive mechanism as a consumption sensor which triggers and activates the electronic components that are protected in a weather-resistance enclosure. For instance, a consumption sensor module can be used with a notification electronics module in the weather-proof enclosure. The electronic module can send a wireless signal of the event to a nearby receptor or data collector. The receptor or data collector can store the information associated with the received signal that may then be retrieved via internet, WiFi, Bluetooth or other communication means by a host computer or handheld devices. Reference will now be made in detail to the description of the embodiments as illustrated in the drawings, wherein like reference numbers indicate like parts throughout the several views.

Following field studies in 1994, the initial Sentricon® system adopted the monitoring-baiting protocol disclosed in U.S. Pat. No. 6,397,516 by Nan-Yao Su. The bait system offers a 600-fold reduction in pesticide use over traditional control measures that spray large quantities of liquid termiticide in the soil beneath and surrounding a home. Considering that a bait toxicant such as noviflumuron is 32-fold less toxic (rat oral LD50:>3,160 mg/kg) than the most commonly used soil termiticide fipronil (rat oral LD50:97 mg/kg), the combined environmental impact of the baiting system is less than that of soil termiticide treatments by a factor of about 19,200. Moreover, owing to their ability to eliminate termite colonies, baits can be used in an area-wide project to protect a community from termite damage. Hence, termite baiting systems are more environmentally and socially sustainable than traditional soil termiticide treatments. Despite these advantages, the early monitoring-bait system was not widely adopted because onsite routine monitoring was labor-intensive and costly.

To resolve this issue, a remote motoring system was developed that utilized circuit conductivity to detect termite feeding activity. As described in U.S. Pat. No. 5,815,090, a conductive circuit was drawn on a termite feeding material and placed in an in-ground monitoring station. Circuit breakage due to termite feeding was communicated to a data collector via wired or wireless links, and the data were accessed via telephone communication by a host computer. Other termite remote monitoring systems have also been published, but they all suffer from the same practical problem. Sensors used in these systems include a continuous circuit on a feeding material, vibration sensor, audio sensor, optical sensor, gas sensor or pressure sensor, all of which contain electronic components that are powered by batteries for a continuous monitoring. Because the sensors have to be accessible to termites in soil, the sensors, power source and other associated electronic components are exposed to highly corrosive soil environment, which renders them useless in a relatively short time of weeks to months.

To avoid corrosive issue, mechanical means or simplified versions with limited electronic components in the soil may be used. The development of the commercial product, Sentricon® with ESP™ technology (Electronic Sensing and Protection) was based on such options. However, this system still uses routine monitoring with a technician traveling to the site to visually confirm the mechanic signal or use a battery-powered interrogator to wave over the sensor and generate a small amount of electricity to determine circuit breakage. More elaborate systems can monitor and control subterranean termites in which multiple sensors are used to detect termite, but a technician has to be onsite to activate the system, and hence is not a remote monitoring system.

Use of durable baits that do not require the monitoring phase of the initial baiting system was proposed by the inventor to avoid the labor cost of monitoring. As described in U.S. Pat. No. 6,857,223, an active bait is protected from the element with a water-proof and non-biodegradable material through which termites can tunnel or chew. The concept led to the commercialization of the durable bait product, the Recruit® HD (High Density) in 2009. Durable baits such as Recruit® HD contain an active ingredient and do not degrade even in the highly corrosive soil environment, hence they remain in soil until being intercepted by termites that would feed on the durable baits, leading to the elimination of the termite colony(s).

The current Sentricon system with Recruit® HD does not require the monitoring phase of the early system, and instead the label prescribes that the baits are inspected annually. Although field studies have shown that Recruit® HD remains efficacious even after about 5 years of exposure in the highly corrosive soil environment, the annual inspection frequency is needed so that a bait that is substantially consumed (e.g., >⅓ or as prescribed by product labels) is replaced with a fresh bait. The annual inspection frequency is prescribed to avoid the total consumption of baits that may lead to the station abandonment before the colony is eliminated.

However, if termites intercept the durable baits shortly after the annual inspection, baits may be totally consumed before the next annual inspection is carried out. Hence it is highly desirable to be able to remotely detect when a substantial amount of bait is consumed and a bait needs to be replaced. Moreover, such technology can extend the currently prescribed annual inspection to once every five years or longer, since durable baits that are not damaged by termites remain efficacious for at least five years and do not need to be inspected or replaced. Incorporation of a technology to remotely detect the event of substantial bait consumption in a bait station will further reduce labor cost associated with baiting system and promote more acceptance of this environmentally and socially sustainable termite control option.

This consumption detection is useful for all pest species of subterranean termites of the family Rhinotermitidae and Termitidae as listed in "Managing social insects of urban importance" by Rust and Su (*Annu. Rev. Entomol.* 57:355-75, 2012). All previous monitoring systems were intended for use in the monitoring-baiting protocol of early termite baiting technology. Because of this, they were designed to continuously monitoring termite activity in soil, and hence required a significant and lasting power source in the stations to be useful. The disclosed bait consumption system differs from previous systems in that it is configured to detect a single event of substantial bait consumption. Hence the notification electronics module can contain a minimal or no power source. This is possible because the durable bait (e.g., Recruit® HD) can remain active in the soil for more than five years and do not need to be replaced until a substantial amount of the bait product (e.g., >⅓, or as prescribed by product labels) is consumed. Advantageously, the consumption detection can extend the annual inspection interval to a 5-year inspection or longer, which will further reduce labor cost associated with baiting system.

Referring now to FIGS. 1A-1C and 2A-2C, detection of bait consumption by termites using a consumption sensor module and a notification electronics module with a weather-proof enclosure will be presented. A non-corrosive consumption sensor can be used to detect when a threshold amount of a durable bait, which can be substantial, has been consumed by subterranean termites in soil. When triggered, the consumption sensor can activate the notification electronics module to emit a signal to an on-site receiver or receptor (e.g., a computer, tablet, smart phone, or other appropriate processing device). The electronics module can be configured to transmit a wireless signal of the detected event to the nearby receptor, which can store the information that may then be retrieved by a host computer or handheld devices. The information can be downloaded via internet, WiFi, Bluetooth or other communication means to the remote host computer or handheld device (e.g., a tablet, smart phone, or other appropriate processing device).

Because consumption sensors are closely linked to the bait that has to be accessible by the termites in soil, they are inevitably exposed to the corrosive soil environment in addition to the termites. As shown in FIGS. 1A-1C, the consumption sensor module can use mechanical means to avoid the corrosion issue that have plagued other monitoring systems that use poorly protected sensors. Consumption sensors can comprise mechanical sensor components made of non-corrosive materials such as stainless steel or plastic. However, non-mechanical means can also be used as long as they are non-corrosive and can resist humid, wet, and corrosive soil environment. The notification electronics module is entirely sealed in a weather-proof enclosure so that the electronic circuitry is not subject to corrosion. With the consumption module, the mechanical sensor is not internally connected to the electronics module. Instead the consumption sensor can externally activate the notification electronics module through the application or removal of a mechanical force so that the weather-proof enclosure is not compromised when inactive.

Figure 3:
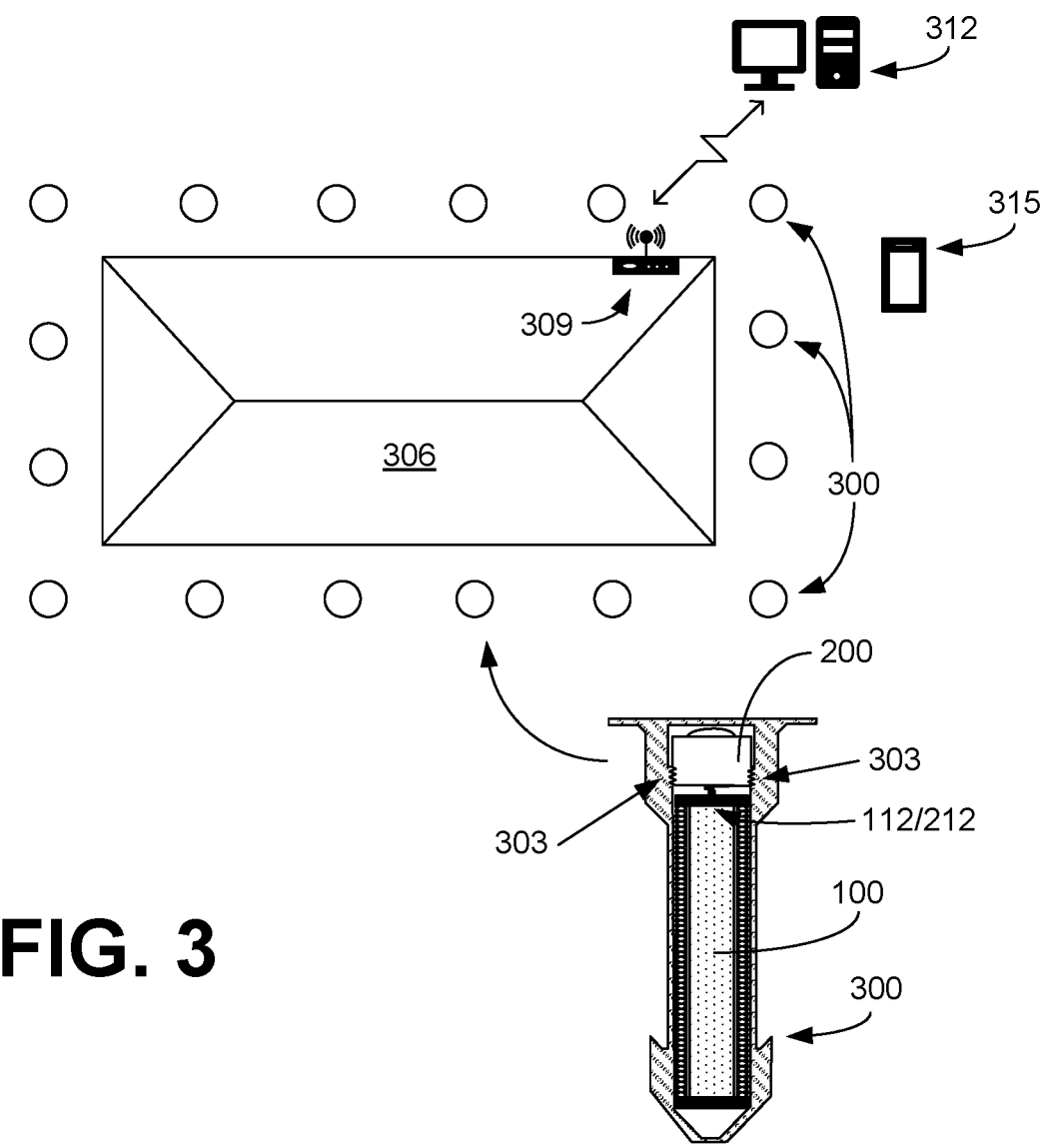
FIG. 3 is a graphical representation illustrating an example of a remote detection system for bait stations, in accordance with various embodiments of the present disclosure.

FIG. 1A illustrates an example of a non-corrosive mechanical consumption sensor module 100a for detecting the substantial consumption of bait by termites in the soil. The durable bait 103 is placed between upper and lower plates 106 connected with multiple loaded springs 109 that vertically compress the durable bait 103 with a force determined by the springs 109. The durable bait 103 can be cylindrical or other appropriate shape that fits in the bait station as illustrated in FIG. 3. When a threshold amount of the durable bait 103 is consumed by the termites (which may be substantial, e.g., >⅓, or as prescribed by product labels), the structural integrity of durable bait 103 becomes compromised and the plates 106 collapse the remaining bait 103 under the pressure applied by the springs 109. The loaded springs 109 can be adjustable by, e.g., the manufacturer or user to account for differences in operating conditions (e.g., environmental variations such as humidity, temperature, etc.). For example, adjustment screw(s) can be coupled to one or both ends of the springs 109 to allow for adjustment of the spring loading and thus the force exerted on the durable bait 103. This can also assist in installation of the durable bait 103 in the sensor module 100a.

Figure 2B:
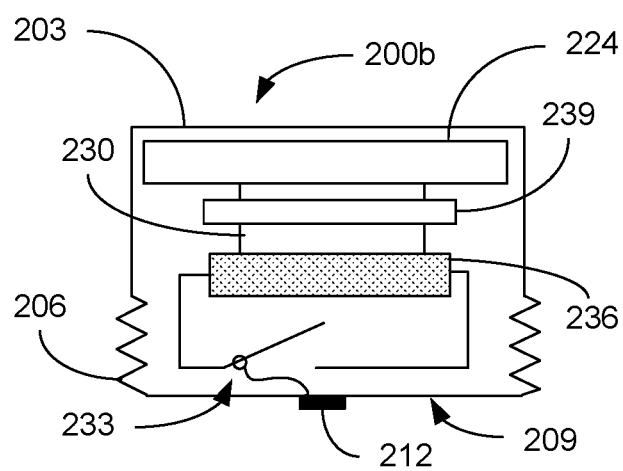
Figure 2C:
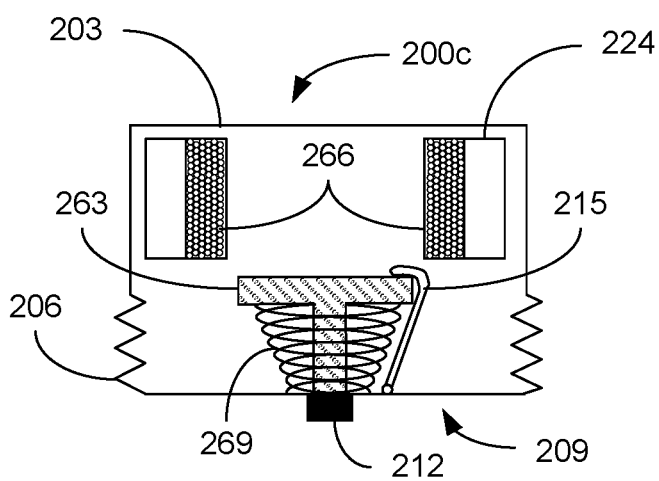

The upper plate 106a is equipped with a connector 112 to a notification electronics module 200 (FIGS. 2A-2C). The shifting position (lowering) of the upper plate 106a can cause the connector 112 on the upper plate 106a to trigger and activate the electronics module 200. For example, the consumption sensor 100 and notification electronics module 200 can be installed in a bait station such that the connector 112 presses against the bottom of the notification electronics module 200. As the bait 103 is consumed, the top and bottom plates 106a and 106b are pulled together by the springs 109 away from the bottom of the electronics module 200. As the upper plate 106a recedes, the connector 112 can trigger the notification electronics module 200 to send a signal indicating that a substantial amount of the bait 103 has been consumed. In some implementations, the bottom plate 106b can be configured to be secured in position in the bait station.

In some embodiments, the connector 112 can be coupled to the bottom of the notification electronics module 200 and as the upper plate 106a is retracted the bottom of the electronics module 200 can be pulled downward to activate the notification electronics module 200. In other embodiments, the connector 112 can press against the bottom of the notification electronics module 200 when initially installed in the bait station. As the plates 106 collapse the bait 103 as it is consumed, pressure applied by the connector to the bottom of the notification electronics module 200 is reduced until a threshold level is reached and the electronics module 200 is activated.

FIG. 1B illustrates another example of a non-corrosive mechanical consumption sensor module 100b that detects the event of substantial consumption of bait 103 by termites in the soil. As shown in FIG. 1B, a hole is vertically drilled in the durable bait 103. The durable bait 103 can be cylindrical or other appropriate shape that fits in the bait station. A spring assembly 130 comprising a plurality of leaf springs 133 (e.g., three), which can be coupled together at joints at the upper and lower ends of the leaf springs 133. The leaf springs 133 are compressed and inserted into the vertical pre-drilled hole at the center of the bait 103. When a threshold amount of bait 103 is consumed by termites, the structural integrity of durable bait 103 is compromised, allowing the compressed leaf springs 133 to push the durable bait 103 outward, and at the same time lowering the position of upper joint of leaf springs 133. The shifting position of the upper joint and connector 112 triggers and activates the notification electronic module 200. As the upper joint recedes, the connector 112 can trigger the notification electronics module 200 to send a signal indicating that a substantial amount of the bait 103 has been consumed. In some implementations, the bottom of the durable bait 103 can include a plate configured to be secured in position in the bait station. The spring assembly 130 can be adjustable by, e.g., the manufacturer or user to account for differences in operating conditions (e.g., environmental variations such as humidity, temperature, etc.). For example, adjustment screw(s) can be coupled to one or both ends of the spring assembly 130 to allow for adjustment of the leaf spring loading and thus the force exerted on the durable bait 103. This can also assist in installation of the spring assembly 130 within the durable bait 103.

In some embodiments, the connector 112 can be coupled to the bottom of the notification electronics module 200 and as the leaf springs 133 expand and the upper joint is retracted the bottom of the electronics module 200 can be pulled downward to activate the notification electronics module 200. In other embodiments, the connector 112 can press against the bottom of the notification electronics module 200 when initially installed in the bait station. As the bait 103 is consumed and the leaf springs 133 expand, pressure applied by the connector 112 to the bottom of the notification electronics module 200 is reduced until a threshold level is reached and the electronics module 200 is activated.

FIG. 1C illustrates another example of a mechanical consumption sensor module 100c that detects the event of substantial consumption of bait 103 by termites in the soil. As shown in FIG. 1C, a pre-drilled channel extends through the axial length of the durable bait 103. The durable bait 103 can be cylindrical or other appropriate shape that fits in the bait station. A feeding rod 163 made of termite feeding material, which can include durable bait, is inserted and fixed at the bottom of the pre-drilled channel at the center the bait 103, e.g., to a bottom plate 166b. The feeding rod 163 can be made of cellulosic materials such as wood, composite paper, or durable bait. The upper part of the feeding rod is attached to a movable upper plate 166a. With the feeding rod 163 inserted and affixed at the bottom of the pre-drilled channel through the durable bait 103, the upper plate 166a compresses a spring 169, e.g., between the upper plate 166a and the top of the bait 103.

With the feeding rod 163 intact, the spring 169 remains compressed. After the termites substantially feed on the outer layer of the bait 103, they gain access to feed and damage the feeding rod 163. Once the termites have eaten through a threshold amount of the feeding rod 163, the tension of the spring 169 will cause it to sever resulting in the upper plate 166a to be pushed upward to trigger the notification electronics module 200. The upper plate 166a is equipped with a connector 112 to the notification electronics module 200. The shifting position of the connector 112 triggers and activates the electronic module 200. The spring 169 can be adjustable by, e.g., the manufacturer or user to account for differences in operating conditions (e.g., environmental variations such as humidity, temperature, etc.). For example, one or more adjustment screw can be coupled to an end of the spring 169 to allow for adjustment of the spring loading and thus the force exerted on the durable bait 103.

In some embodiments, the connector 112 can be coupled to the bottom of the notification electronics module 200 and upper plate 166a is released the bottom of the electronics module 200 can be pushed upward (or inward) to activate the notification electronics module 200. In other embodiments, the connector 112 can be positioned below the bottom of the notification electronics module 200 when installed in the bait station. As the bait 103 and the feeding rod 163 is consumed, force is applied by the connector 112 to the bottom of the notification electronics module 200 until a threshold level is reached and the electronics module 200 is activated.

Referring next to FIGS. 2A-2C, shown are various embodiments of notification electronics module 200 that can be used in conjunction with a consumption sensor module 100 to detect a consumption event. FIG. 2A shows an example of a notification electronics module 200a that is entirely sealed by a weather-proof enclosure 203. A trigger mechanism at the lower (or bottom) part of the enclosure 203 can be communicatively coupled to the consumption sensor module 100 so that when activated, the electronics module 200a is triggered and active to transmit an indication of the consumption event. The notification electronics module 200a is sealed from all sides with the weather-proof enclosure 203. The enclosure 203 can include a screw thread 206 so that it can be stabilized inside a bait station, or the consumption sensor module 100 can comprise an opposite screw thread to be secured to the thread 203 of the notification electronics module 200.

One side of the enclosure 203 (e.g., the bottom surface 209) may be flexible, or alternatively a portion of the enclosure 203 may be in such a form so as to transfer external force from the consumption sensor module 100 to the trigger mechanism and/or circuitry of the notification electronics module 200. For example, applying a force or removing pressure to a trigger connector 212 can activate a switch mechanism 215, which can initiate transmission of a notification signal indicating that an event has occurred. In the example of FIG. 2A, activating the switch mechanism 215 releases a pressurized piston 218 to strike a piezoelectric plate 221 to generate a burst of electricity that can initiate the signal transmission by a signal emitter 224 (e.g., wireless transmitter or transceiver).

The switch mechanism 212 releases the piston 218 that is then pushed upward by a loaded spring 227. The upward force against the piezoelectric plate 221 generates a burst of electricity that is transferred via cables or other circuitry 230 to activate the signal emitter 224. The notification signal is wirelessly transmitted to a nearby receiver or receptor that can store the information, which can then be downloaded on a routine basis to a host computer or handheld devices via internet, WiFi, Bluetooth, or any other appropriate communication means. In some implementations, the receiver can transmit an indication that an event notification has been received by the notification electronics module 200a. In some embodiments, the signal emitter 224 can include RFID circuitry allowing for interrogation of the notification electronics module 200a to confirm that the switch mechanism 215 has been triggered and the electronics module 200a activated.

FIG. 2B shows another example of a notification electronics module 200b that is entirely sealed by a weather-proof enclosure. The electronics module 200b can be sealed from all sides to form the weather-proof enclosure. The enclosure 203 can be equipped with a screw thread 206 so that it can be stabilized inside a bait station or connected to the consumption sensor module 100. A trigger connector 212 at the lower portion 209 of the enclosure 203 can be connected to the consumption sensor module 100 so that when activated it closes a switch 233 to connect a power source 236 (e.g., a small coin lithium battery) to the signal emitter 224. In some implementations, a voltage booster 239 can be included to generate a burst of high voltage electricity by emptying off all battery energy so as to send a stronger signal to a receptor at longer distance.

One side of the enclosure 203 (e.g., the bottom surface 209) may be flexible, or alternatively a portion of the enclosure 203 may be in such a form so as to transfer external force from the consumption sensor module 100 to the trigger mechanism and/or circuitry of the notification electronics module 200. For example, applying a force or removing pressure to a trigger connector 212 can activate a switch mechanism 233, which can initiate transmission of a notification signal indicating that an event has occurred. In the example of FIG. 2B, activating the switch mechanism 233 can complete a circuit to generate a burst of electricity that can initiate the signal transmission by a signal emitter 224. For instance, the switching mechanism 233 may be held open with pressure applied to the trigger connector 212, and can be closed as the pressure is removed. In other implementations, an applied force can cause the switch mechanism 233 to close.

Closing the switch mechanism 233 connects the power source 236 (e.g., battery) to the signal emitter 224 via cables or other circuitry 230 to activate the signal emitter 224. The shelf-life of a coin lithium battery can exceed six years; hence it remains effective for the duration of the efficacy of the durable bait 103. A voltage booster 239 such as boost-step-up power module or boost-voltage converter can be used to drain all power source in the battery to generate more power to send a wireless signal at longer distance. The notification signal is wirelessly transmitted to a nearby receiver or receptor that can store the information, which can then be downloaded on a routine basis to a host computer or handheld devices via internet, WiFi, Bluetooth, or any other appropriate communication means. In some implementations, the receiver can transmit an indication that an event notification has been received by the notification electronics module 200b. In some embodiments, the signal emitter 224 can include RFID circuitry allowing for interrogation of the notification electronics module 200b to confirm that the switch mechanism 233 has been triggered and the electronics module 200b activated.

FIG. 2C shows another example of a notification electronics module 200c that is entirely sealed by a weather-proof enclosure. The electronics module 200b can be sealed from all sides to form the weather-proof enclosure. The enclosure 203 can be equipped with a screw thread 206 so that it can be stabilized inside a bait station or connected to the consumption sensor module 100. A trigger connector 212 at the lower portion 209 of the enclosure 203 can be connected to the consumption sensor module 100 so that when activated a pressurized piston is released to push upward a permanent magnet 263 through a hole or channel surrounded by a coiled copper wire 266 to generate a burst of electricity to activate the signal emitter 224.

One side of the enclosure 203 (e.g., the bottom surface 209) may be flexible, or alternatively a portion of the enclosure 203 may be in such a form so as to transfer external force from the consumption sensor module 100 to the trigger mechanism and/or circuitry of the notification electronics module 200. For example, applying a force or removing pressure to a trigger connector 212 can activate a switch mechanism 215, which can initiate transmission of a notification signal indicating that an event has occurred. In the example of FIG. 2C, activating the switch mechanism 215 releases a pressurized piston to move a permanent magnet 263 inside a coil 266 to generate a burst of electricity that can initiate the signal transmission by a signal emitter 224. When the switch mechanism 215 releases the piston, a loaded spring 269 pushes the permanent magnet 263 upward. As the permanent magnet 263 travels upward through the empty space inside the coiled wire 266, a burst of electricity is generated to activate the signal emitter 224. The notification signal is wirelessly transmitted to a nearby receiver or receptor that can store the information, which can then be downloaded on a routine basis to a host computer or handheld devices via internet, WiFi, Bluetooth, or any other appropriate communication means. In some implementations, the receiver can transmit an indication that an event notification has been received by the notification electronics module 200c. In some embodiments, the signal emitter 224 can include RFID circuitry allowing for interrogation of the notification electronics module 200c to confirm that the switch mechanism 215 has been triggered and the electronics module 200c activated.

FIG. 3 shows a schematic representation of an example of a distributed system to remotely detect the event of substantial bait consumption in bait stations surrounding a home or other building, including an assembly of a consumption sensor module 100 and a notification electronics module 200 in a bait station 300 that wirelessly communicates with a receiver or receptor to store the information of the event. The information in the receptor can be downloaded via internet or other appropriate communication means to a remote host computer, or via WiFi, Bluetooth or other appropriate communication means to a handheld device (e.g., a tablet, smart phone, or other appropriate processing device).

In the example of FIG. 3, the consumption sensor module 100 (FIGS. 1A-1C) and notification electronics module 200 (FIGS. 2A-2C) can be communicative coupled together with the connector 112 and trigger connector 212 to form a single unit that can then be inserted into a bait station 300. A female screw thread 303 can be fabricated on the inner wall of the bait station 300 at a position to receive the male thread 206 of the notification electronics module 200 so as to secure the consumption sensor module 100 and notification electronics module 200 in the bait station 300. In other embodiments, a female thread may be pre-fabricated on the outer wall of the consumption sensor module 100 to secure it in the bait station 300.

Multiple bait stations 300 can be installed in the soil around a building 306 (e.g., a house), with some or all of which having a consumption sensor module 100 and notification electronics module 200 installed. When a substantial amount of bait is consumed in a bait station 300, the consumption sensor module 100 activates the notification electronic module 200 which sends a signal to an onsite receiver or receptor 309. A reception range extender, using wired and/or wireless means, may be used increase the receiver capacity. The information received from the notification electronics module 200 can be stored in the receiver 309 and downloaded to a remote host computer 312 via internet or other appropriate communication means, or to a handheld device 315 via WiFi, Bluetooth or other appropriate communication means.

EXAMPLE

Two experiments, one each for dry and wet baits, were conducted to determine the force (in-kg) required to collapse a durable bait 103 whose structural integrity has been compromised by drilling from all sides to remove a predetermined amount of bait material. The first experiment was done to simulate the dry weather condition in which durable baits 103 are mostly dry. Six large holes (1.27 cm diameter) were evenly spaced and drilled through a Recruit® HD bait (ca. 1.5 cm diameter and 18 cm long) along the 18 cm side of the bait material. Another six large holes were drilled at a 90° angle to and at an alternate position to the initial six holes. A Recruit® HD bait loses ca. 31% weight with 12 drill holes (1.27 cm diameter). To remove further weight, multiple small holes (0.36 cm) were drilled through the bait between the 12 large holes initially drilled in the bait material. All baits 103 were weighted before and after drilling to determine the % weight loss. A Recruit® HD bait with known amount of weight loss were then pressed from the two smaller ends (ca. 1.5 cm diameter) with a pre-determined weight until collapse.

The second experiment was done to simulate the wet and humid weather conditions, where durable baits 103 can absorb water and develop cracks. A similar procedure as in the first dry experiment was used to remove bait mass, except the drilled baits 103 were then soaked in water for 48 hours, until they developed cracks. The wet baits 103 were then subjected to same procedure to determine the force (in-kg) to collapse the baits 103.

Figure 4:
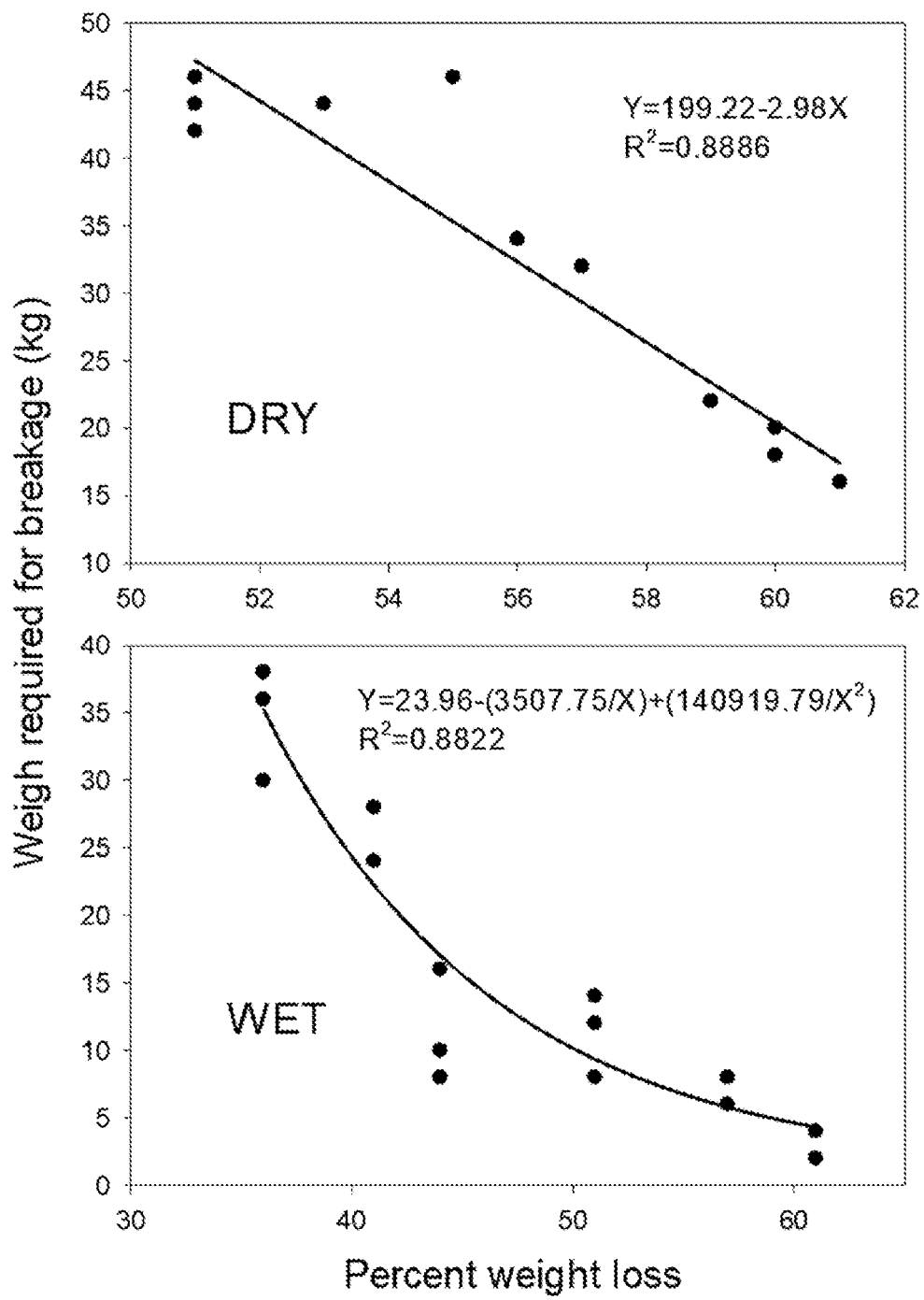
FIG. 4 illustrates an example of the relationship between collapse pressure of a durable bait (Recruit® HD) that has been pre-drilled to remove a predetermined amount of weight, for wet and dry baits, in accordance with various embodiments of the present disclosure.

FIG. 4 shows the relationship between the amount of pressure (kg) needed to collapse a durable bait 103 (Recruit® HD) that has been pre-drilled to remove a pre-determined amount of weight, for both wet and dry baits. For dry baits, the relationship between the % weight loss and force required for breakage was linear, and it took ca. 16-46 kg to collapse the Recruit® HD baits 103 with ca. 51-61% weight loss. Hence if the configuration as in FIG. 1A is used, the springs 109 loaded with a force of 20 kg may be used to detect a bait with 60% weight loss in a dry condition. For wet baits 103, the relationship between the % weight loss and force required for breakage was best described by an inverse second order polynomial. It took ca. 2-38 kg to collapse the Recruit® HD baits 103 with ca. 36-61% weight loss. Hence, if the configuration in FIG. 1A is used, springs 109 loaded with a force of 10 kg may be used to detect a bait with 50% weight loss in a wet condition.

Figure 5:
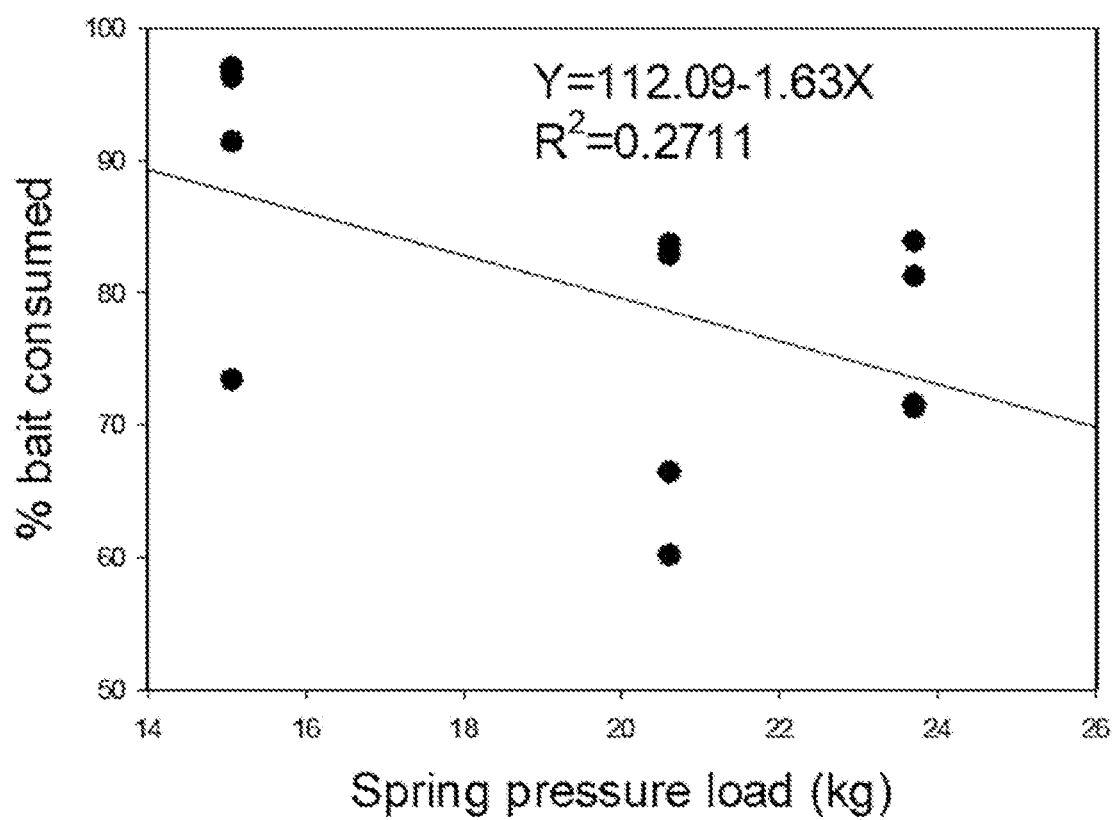
FIG. 5 illustrates an example of the relationship between the percent bait consumption by termites and the pressure to collapse of the durable bait, in accordance with various embodiments of the present disclosure.

FIG. 5 shows the relationship between the percent bait consumption by termites and the pressure (kg) required to collapse a durable bait 103 (Recruit® HD). Untreated Recruit® HD baits 103 were dried in a desiccator and weighed to determine their initial dry weights. The baits 103 were then pressed vertically with two springs 109 as illustrated in FIG. 1A. Springs 109 of three sizes were used. When pulled to the length of the bait 103, the pressures generated by the three springs 109 were measured at 15.07, 20.61 or 23.71 kg. The pressurized baits were housed in clear plastic tubes (7.6 cm diameter and 26.7 cm high) with two open ends before the units were placed in laboratory colonies of the Formosan subterranean termites confined in large plastic chambers (90 cm×90 cm×90 cm). Each chamber contained a hundred thousand to millions of termites and were maintained at ca. 26° C. for several years. Three units, each with one of the three pressure loads, were placed in a chamber to be fed on by a colony of termites. The experiment was repeated four times by using four termite colonies. A total of 12 spring-loaded bait units were used. The units were observed daily until the springs 109 collapsed the bait 103 due to its weaken structural strength caused by the termite feeding. The collapsed baits 103 and all bait remnants in the clear plastic tube were recovered and rinsed with water to remove debris before being dried in the desiccator and reweighed. The final weights were used to calculate percent bait consumption. A linear regression was used to establish the relationship between % bait consumption and the pressure loads of the springs as shown in FIG. 5.

There was a general trend of a higher spring load needed to collapse less-consumed baits, but there was a great variability as shown in FIG. 5. Springs 109 with the lowest load of 15.07 kg collapsed the baits 103 when 73-97% of the bait was consumed, and springs 109 with the heaviest load of 23.71 kg collapsed the baits 103 when 71-84% bait was consumed. Springs 109 with the medium load of 20.4 kg, however, were able to collapse two of the baits 103 when 60-66% of the bait was consumed (another two replicates ranged 83-84%). In addition to the loaded force, the timing for a bait to collapse by the spring load, however, may be due to the location of the bait consumption. It is quite possible, for example, that baits with surface damage may withstand higher pressure than those with internal damage. Despite the variability, the results showed that all three spring types with different loads can collapse the baits 103 when 60-97% of the bait was consumed by termites, which satisfy the current product label requirement of more than 33.3%.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A termite feeding detection apparatus, comprising:
   a bait station comprising a central channel;
   a consumption sensor module disposed in the central channel of the bait station, the consumption sensor module including durable bait, the consumption sensor module configured to detect when a threshold amount of the durable bait has been consumed; and
   a notification electronics module comprising a weather-proof enclosure entirely sealing electronic circuitry of the notification electronics module, the notification electronics module detachably affixed in the central channel of the bait station and communicatively coupled to the consumption sensor module via a trigger connector located at a portion of the weather-proof enclosure adjacent to the consumption sensor module, where a force applied by the consumption sensor module against the trigger connector is changed in response to the threshold amount of the durable bait having been consumed, the notification electronics module comprising the electronic circuitry configured to wirelessly transmit a signal in response to detection of the change in the force applied to the trigger connector corresponding to the threshold amount of durable bait consumption.

2. The termite feeding detection apparatus of claim 1, wherein the consumption sensor module comprises non-corrosive mechanical components arranged to detect when the threshold amount of the durable bait has been consumed.

3. The termite feeding detection apparatus of claim 2, wherein the threshold amount is greater than ⅓ of the durable bait initially installed in the consumption sensor module.

4. The termite feeding detection apparatus of claim 2, wherein the non-corrosive mechanical components comprise an upper plate and a lower plate positioned on opposite sides of the durable bait, the upper and lower plates connected with a plurality of loaded springs thereby compressing the durable bait between the upper and lower plates.

5. The termite feeding detection apparatus of claim 4, wherein the upper and lower plates move toward each other and collapse the durable bait when the threshold amount of the durable bait has been consumed.

6. The termite feeding detection apparatus of claim 5, wherein the upper plate retracts from the notification electronics module as the durable bait is collapsed, the notification electronics module activated by the retraction of the upper plate.

7. The termite feeding detection apparatus of claim 2, wherein the non-corrosive mechanical components comprise a spring assembly including a plurality of leaf springs coupled at opposite ends and curving outward between the opposite ends, the spring assembly installed in a channel extending through the durable bait.

8. The termite feeding detection apparatus of claim 7, wherein the plurality of leaf springs are compressed inward between the opposite ends to insert the spring assembly into the channel, where the opposite ends extend away from each other as the plurality of leaf springs are compressed.

9. The termite feeding detection apparatus of claim 8, wherein the plurality of leaf springs expand outward when the threshold amount of the durable bait has been consumed, where the opposite ends retract toward each other as the plurality of leaf springs expand outward.

10. The termite feeding detection apparatus of claim 9, wherein the notification electronics module activated by the retraction of the opposite ends of the spring assembly.

11. The termite feeding detection apparatus of claim 2, wherein the non-corrosive mechanical components comprise a movable upper plate attached to a first end of a feeding rod passing through a channel extending through the durable bait, a second end of the feeding rod affixed at a bottom of the channel thereby compressing a spring between the movable upper plate and a top of the durable bait.

12. The termite feeding detection apparatus of claim 11, wherein the feeding rod comprises a cellulosic material.

13. The termite feeding detection apparatus of claim 11, wherein the movable upper plate is released when a portion of the feeding rod is consumed, the spring causing the upper plate to apply a force to the notification electronics module.

14. The termite feeding detection apparatus of claim 1, wherein the notification electronics module comprises a trigger that releases a piston in response to a change in force against a flexible portion of the weather-proof enclosure.

15. The termite feeding detection apparatus of claim 14, wherein a spring forces the piston against a piezoelectric plate when released, thereby generating a burst of electricity that activates a signal emitter of the notification electronics module.

16. The termite feeding detection apparatus of claim 14, wherein the piston comprises a permanent magnet that, when released, extends into a coil thereby generating a burst of electricity that activates a signal emitter of the notification electronics module.

17. The termite feeding detection apparatus of claim 1, wherein the notification electronics module comprises a switch that couples a power source to a signal emitter in response to a change in force against a flexible portion of the weather-proof enclosure.

18. The termite feeding detection apparatus of claim 17, wherein the power source is a lithium battery.

* * * * *